(12) United States Patent
Nishioka et al.

(10) Patent No.: US 7,365,119 B2
(45) Date of Patent: Apr. 29, 2008

(54) RUBBER COMPOSITION FOR TIRE TREAD COMPRISING A PIEZOELECTRIC MATERIAL

(75) Inventors: Kazuyuki Nishioka, Kobe (JP); Hiroyuki Kishimoto, Kobe (JP); Takahiro Mabuchi, Kobe (JP); Kiyoshige Muraoka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 260 days.

(21) Appl. No.: 10/841,528

(22) Filed: May 10, 2004

(65) Prior Publication Data

US 2004/0242745 A1    Dec. 2, 2004

(30) Foreign Application Priority Data

May 27, 2003    (JP)    ............................. 2003-149041

(51) Int. Cl.
*C08K 3/10*    (2006.01)

(52) U.S. Cl. ..................... 524/408; 524/413; 524/434; 524/436

(58) Field of Classification Search ................ 524/408, 524/413, 434, 436
See application file for complete search history.

(56) References Cited

U.S. PATENT DOCUMENTS

| | | | |
|---|---|---|---|
| 4,639,396 A | 1/1987 | Semsarzadeh | |
| 5,723,529 A | 3/1998 | Bernard et al. | |
| 5,902,856 A * | 5/1999 | Suzuki et al. | 525/237 |
| 6,066,697 A * | 5/2000 | Coran et al. | 525/193 |
| 2003/0130398 A1 * | 7/2003 | Wang | 524/430 |

FOREIGN PATENT DOCUMENTS

| | | |
|---|---|---|
| EP | 0 496 112 A2 | 7/1992 |
| EP | 0 631 982 A2 | 1/1995 |
| EP | 1 072 488 A2 | 1/2001 |
| JP | 57151405 A * | 9/1982 |
| JP | 63213563 A * | 9/1988 |
| JP | 7-278914 A | 10/1995 |
| JP | 09309976 A * | 12/1997 |
| JP | 2000-319447 A | 11/2000 |
| JP | 2001-184947 A | 7/2001 |
| JP | 2001-191719 A | 7/2001 |
| JP | 2002-080642 A | 3/2002 |
| JP | 2002-097303 A | 4/2002 |
| JP | 2003-55505 A | 2/2003 |

OTHER PUBLICATIONS

DERWENT abstract for JP 57151405 and JP 63213563.*
JPO machine translation of JP 09-309976, pp. 1-5.*
DERWENT abstract for JP 57151405 Sep. 1982 and JP 63213563 Sep. 1988.*
JPO machine translation of JP 09-309976, pp. 1-5, Feb. 1997.*

* cited by examiner

*Primary Examiner*—Kriellion A Sanders
(74) *Attorney, Agent, or Firm*—Birch, Stewart, Kolasch & Birch, LLP

(57) ABSTRACT

The present invention provides a rubber composition for a tire capable of improving gripping performance of a tire and a tire using the rubber composition. More specifically, the present invention relates to a rubber composition for a tire tread comprising 1 to 150 parts by weight of a piezoelectric material, based on 100 parts by weight of a natural rubber and/or a diene synthetic rubber and a tire using the rubber composition for a tire tread. The average particle size of the piezoelectric material is preferably 0.01 to 50 μm.

6 Claims, No Drawings

RUBBER COMPOSITION FOR TIRE TREAD COMPRISING A PIEZOELECTRIC MATERIAL

This Non-provisional application claims priority under 35 U.S.C. § 119(a) on Patent Application No(s). 2003-149041 filed in Japan on May 27, 2003, the entire contents of which are hereby incorporated by reference.

BACKGROUND OF THE INVENTION

The present invention relates to a rubber composition for a tire and a tire using the same. Specifically, the present invention relates to a rubber composition for a tire capable of improving gripping performance of a tire and a tire using the rubber composition.

Conventionally, various studies have been conducted in order to improve gripping performance required in a tire. In order to improve gripping performance, known is the method of increasing the amount of styrene and vinyl in styrene butadiene rubber (SBR) to raise the glass transition temperature. However, according to this method, abrasion resistance decreases. Also, the method of improving gripping performance by using a large amount of oil is known, but abrasion resistance also decreases in this case. Furthermore, the method of using fine particles of carbon black is known, but when a large amount of carbon black is used, dispersion of carbon black is poor and abrasion resistance decreases.

In order to solve these problems, suggested are the method of adding an inorganic compound such as tungsten (JP-A-2000-3194 47), the method of adding acrylic resin (JP-A-2002-80642) and the method of adding urethane particles (JP-A-2002-97303) to the rubber composition. However, a rubber composition that exhibits sufficient gripping performance does not yet exist.

SUMMARY OF THE INVENTION

The present invention aims to provide a rubber composition for a tire capable of improving gripping performance of a tire and a tire using the rubber composition.

That is, the present invention relates to a rubber composition for a tire tread comprising 1 to 150 parts by weight of a piezoelectric material, based on 100 parts by weight of a natural rubber and/or a diene synthetic rubber.

The average particle size of the piezoelectric material is 0.01 to 50 μm.

The present invention also relates to a tire using the rubber composition for a tire tread.

DETAILED DESCRIPTION

The rubber composition for a tire tread of the present invention comprises a rubber component and a piezoelectric material.

The rubber component used in the present invention comprises natural rubber and/or diene synthetic rubber. Examples of the diene synthetic rubber are styrene-butadiene rubber (SBR), isoprene rubber (IR), acrylonitrile-butadiene rubber (NBR), isobutylene-isoprene rubber (IIR) and chloroprene rubber (CR). These rubbers may be used alone or two or more kinds may be used together.

The piezoelectric material used in the present invention has the function of converting vibrational energy into electric energy. As such piezoelectric material, piezoelectric ceramics and piezoelectric polymers are used. Specific examples are piezoelectric ceramics such as $BaTiO_3$, $(Ba,Pb)TiO_3$, $(Ba,Ca)TiO_3$, $(K, Na)NbO_3$, $(K, Li)NbO_3$, $Pb(Zr,Ti)O_3$ (PZT), PZT containing composite perovskite, PLZT (PZT doped with La), $Bi_4Ti_3O_{12}$, $LiNbO_3$, $LiTiO_3$, $ZnO$, $AlN$ and $PbTiO_3$ and piezoelectric polymers such as polyvinylidene fluoride, copolymer of vinylidene fluoride and trifluoroethylene, copolymer of vinylidene cyanide and vinyl acetate, polytetrafluoroethylene, polyvinyl acetate iodide and polyurea.

The amount of the piezoelectric material is 1 to 150 parts by weight, preferably 5 to 100 parts by weight, more preferably 10 to 50 parts by weight, based on 100 parts by weight of the rubber component. When the amount is less than 1 part by weight, the effect of improving gripping performance of a tire is insufficient. When the amount is more than 150 parts by weight, abrasion resistance decreases.

The average particle size of the piezoelectric material is preferably 0.01 to 50 μm, more preferably 0.01 to 10 μm. When the average particle size is less than 0.01 μm, the effect of improving gripping performance of a tire may not be sufficient. When the average particle size is more than 50 μm, abrasion resistance tends to decrease. The shape of the piezoelectric material does not need to be spherical and can be plates, thin film or irregular shapes. In any case, the maximum particle size when pulverized or cut is preferably within the above range of the average particle size.

The Curie temperature of the piezoelectric material is preferably at least 100° C. When the Curie temperature is lower than 100° C., the effect of improving gripping performance may not be obtained, due to piezoelectric loss.

The piezoelectric constant (g33) of the piezoelectric material is preferably at least $5 \times 10^{-3}$ Vm/N. When the piezoelectric constant is less than $5 \times 10^{-3}$ Vm/N, the effect of improving gripping performance may not be obtained.

The orientation of polar domains can be coordinated, by subjecting the piezoelectric material to poling treatment, wherein high voltage is applied in hot silicon oil.

The rubber composition for a tire tread of the present invention can also contain a reinforcing filler. The reinforcing filler can be used alone or two or more kinds can be used together. As the reinforcing filler, any filler that is commonly used in the conventional rubber composition for a tire can be selected, but mainly carbon black is preferable.

The content of carbon black is preferably 10 to 200 parts by weight, more preferably 20 to 150 parts by weight, based on 100 parts by weight of the diene rubber component. When the content of carbon black is less than 10 parts by weight, abrasion resistance tends to decrease. When the amount is more than 200 parts by weight, processability tends to become poor. The nitrogen-adsorbing specific surface area of carbon black is preferably 80 to 280 m²/g, more preferably 100 to 200 m²/g. When the nitrogen-adsorbing specific surface area is less than 80 m²/g, gripping performance and abrasion resistance tend to decrease. When the nitrogen-adsorbing specific surface area is more than 280 m²/g, sufficient dispersion is difficult to obtain and abrasion resistance tends to decrease.

Besides the above components, the rubber composition for a tire tread of the present invention can also contain additives that are usually used in the rubber industry, such as a vulcanizing agent including sulfur, various vulcanization accelerators, various softening agents, various antioxidants, stearic acid, an antiozonant and zinc oxide.

The tire of the present invention is prepared by the usual method using the rubber composition for a tire tread of the present invention. That is, the rubber composition for a tire tread of the present invention, to which the above additives are added when necessary, is extrusion molded into the shape of each member of the tire before vulcanization and then molded by the usual method on a tire forming machine to prepare an unvulcanized tire. The unvulcanized tire is heated and pressurized in a vulcanizer to obtain a tire. The tire of the present invention obtained in this way is excellent in gripping performance.

Hereinafter, the present invention is explained in detail by means of Examples, but the present invention is not limited thereto.

The materials used in Examples and Comparative Examples are described below.

SBR: SBR1502 available from Sumitomo Chemical Co., Ltd.
Carbon black: N220 (nitrogen-adsorbing specific surface area: 125 m$^2$/g) available from Showa Cabot Co., Ltd.
Piezoelectric material 1: PZT (average particle size: 3.5 μm, Curie temperature: 300° C., piezoelectric constant: $2.2 \times 10^{-2}$ Vm/N) available from Tayca Corporation
Piezoelectric material 2: polyvinylidene fluoride (average particle size: 5 μm, Curie temperature: 120° C., piezoelectric constant: $7.0 \times 10^{-2}$ Vm/N) available from Kureha Chemical Industry Co., Ltd.
Antioxidant: NOCRAC 6C available from Ouchi Shinko Chemical Industrial Co., Ltd.
Stearic Acid: Stearic acid available from NOF Corporation
Zinc oxide: Zinc Oxide type 1 available from Mitsui Mining and Smelting Co., Ltd.
Sulfur: powdery sulfur available from Tsurumi Chemicals Co., Ltd.
Vulcanization accelerator: Nocceler NS available from Ouchi Shinko Chemical Industrial Co., Ltd.

The materials were kneaded and mixed according to the composition shown in Table 1 to obtain each rubber composition. These rubber compositions were press vulcanized at 170° C. for 20 minutes to obtain a vulcanized article. The following evaluations of properties were conducted for the obtained rubber composition.

EXAMPLES 1 TO 4 AND COMPARATIVE EXAMPLE 1

The evaluation methods are described below.

(1) Gripping Performance (Rubber)

Loss tangent (tanδ) was measured under dynamic strain amplitude of 1%, frequency of 10 Hz and temperature of 40° C. using a spectrometer made by Ueshima Seisakusho. Comparative Example 1 was assumed to 100 to represent the tanδ value as an index. The larger the value, the more favorable the gripping performance.

(2) Gripping Performance (Actual Machine)

A 195/65R15 size tire having a tread comprising the rubber composition was prepared and using this tire, a running test with an actual machine was conducted on an asphalt road test course. The stability of steering control was evaluated by the test driver on a 5-point scale (5: good, 4: slightly good, 3: normal, 2: slightly poor, 1: poor).

TABLE 1

|  | Ex. | | | | Com. Ex. |
| --- | --- | --- | --- | --- | --- |
|  | 1 | 2 | 3 | 4 | 1 |
| Composition (parts by weight) | | | | | |
| SBR | 100 | 100 | 100 | 100 | 100 |
| Carbon black | 50 | 50 | 50 | 50 | 50 |
| Piezoelectric material 1 | 5 | 30 | — | — | — |
| Piezoelectric material 2 | — | — | 5 | 30 | — |
| Antioxidant | 1 | 1 | 1 | 1 | 1 |
| Stearic acid | 2 | 2 | 2 | 2 | 2 |
| Zinc oxide | 2 | 2 | 2 | 2 | 2 |
| Sulfur | 1.5 | 1.5 | 1.5 | 1.5 | 1.5 |
| Vulcanization accelerator | 1.5 | 1.5 | 1.5 | 1.5 | 1.5 |
| Evaluation | | | | | |
| Gripping Performance (rubber) | 105 | 110 | 105 | 107 | 100 |
| Gripping Performance (actual machine) | 4 | 5 | 4 | 4 | 3 |

As shown in Table 1, the rubber compositions of Examples 1 to 4 containing piezoelectric material are improved in gripping performance of rubber and gripping performance of an actual machine compared to Comparative Example 1.

The present invention can provide a rubber composition for a tire capable of improving gripping performance of a tire and a tire using the rubber composition.

What is claimed is:

1. A rubber composition for a tire tread comprising 1 to 150 parts by weight of a piezoelectric material, based on 100 parts by weight of a natural rubber and/or a diene synthetic rubber, wherein the piezoelectric material is at least one selected from the group consisting of $BaTiO_3$, $(Ba,Pb)TiO_3$, $(Ba,Ca)TiO_3$, $(K,Na)NbO_3$, $(K,Li)NbO_3$, $Pb(Zr,Ti)O_3$, $Pb(Zr,Ti) O_3$ containing composite perovskite, $Pb(Zr,Ti)O_3$ doped with La, $Bi_4Ti_3O_{12}$, $LiNbO_3$, $LiTiO_3$, AlN, $PbTiO_3$, copolymer of vinylidene fluoride and trifluoroethylene, copolymer of vinylidene cyanide and vinyl acetate, polyvinyl acetate iodide, and polyurea.

2. The rubber composition for a tire tread of claim 1, wherein the average particle size of said piezoelectric material is 0.01 to 50 μm.

3. A tire having a tread, wherein the tread is formed from the rubber composition of claim 1 or 2.

4. The tire of claim 3, wherein the piezoelectric material is present in an amount of 5 to 100 parts by weight, based on 100 parts by weight of the natural rubber and/or the diene synthetic rubber.

5. The tire of claim 3, wherein the piezoelectric material is present in an amount of 10 to 50 parts by weight, based on 100 parts by weight of the natural rubber and/or the diene synthetic rubber.

6. The tire of claim 3, wherein the average particle size of said piezoelectric material is 0.01 to 10 μm.

* * * * *